(12) United States Patent
Cody et al.

(10) Patent No.: US 7,087,152 B2
(45) Date of Patent: **\*Aug. 8, 2006**

(54) WAX ISOMERATE YIELD ENHANCEMENT BY OXYGENATE PRETREATMENT OF FEED

(75) Inventors: Ian A. Cody, Baton Rouge, LA (US); William J. Murphy, Baton Rouge, LA (US); Sylvain Hantzer, Prairieville, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/678,684

(22) Filed: Oct. 3, 2003

(65) Prior Publication Data

US 2004/0108246 A1    Jun. 10, 2004

Related U.S. Application Data

(60) Provisional application No. 60/416,869, filed on Oct. 8, 2002.

(51) Int. Cl.
  C10G 69/08    (2006.01)
  C10G 73/02    (2006.01)

(52) U.S. Cl. .................. 208/58; 208/59; 208/27; 208/111.35; 208/89

(58) Field of Classification Search .......... 208/58, 208/59, 27, 111.35, 89
See application file for complete search history.

(56) References Cited

U.S. PATENT DOCUMENTS

| | | | |
|---|---|---|---|
| 2,250,410 A | 7/1941 | Van Peski | 260/676 |
| 3,711,399 A | 1/1973 | Estes | 208/112 |
| 4,097,364 A | 6/1978 | Egan | 208/111 |
| 4,181,597 A | 1/1980 | Yan et al. | 208/46 |
| 4,335,019 A | 6/1982 | Bowes et al. | 252/450 |
| 4,377,469 A * | 3/1983 | Shihabi | 208/111.15 |
| 4,388,177 A | 6/1983 | Bowes et al. | 208/111 |
| 4,397,827 A | 8/1983 | Chu | 423/326 |
| 4,402,866 A | 9/1983 | Shihabi | 252/455 |
| 4,431,516 A | 2/1984 | Baird et al. | 208/111 |
| 4,431,517 A | 2/1984 | Nevitt et al. | 208/111 |
| 4,431,519 A | 2/1984 | LaPierre et al. | 208/111 |
| 4,431,527 A | 2/1984 | Miller et al. | 208/254 |
| 4,436,614 A | 3/1984 | Olbrich et al. | 208/89 |
| 4,440,871 A | 4/1984 | Lok et al. | 502/214 |
| 4,460,698 A | 7/1984 | Hensley, Jr. et al. | 502/66 |
| 4,483,764 A | 11/1984 | Hensley, Jr. et al. | 208/111 |
| 4,490,242 A | 12/1984 | Oleck et al. | 208/97 |
| 4,510,045 A | 4/1985 | Dessau | 208/111 |
| 4,568,449 A | 2/1986 | Angmorter et al. | 208/215 |
| 4,585,747 A | 4/1986 | Valyocsik | 502/62 |
| 4,594,146 A | 6/1986 | Chester et al. | 208/111 |
| 4,599,162 A | 7/1986 | Yen | 208/59 |
| 4,601,993 A | 7/1986 | Chu et al. | 502/66 |
| 4,610,778 A | 9/1986 | Graven | 208/89 |
| 4,622,130 A | 11/1986 | Stem | 208/87 |
| 4,636,299 A | 1/1987 | Unmuth et al. | 208/87 |
| 4,684,756 A | 8/1987 | Derr, Jr. et al. | 585/330 |
| 4,784,747 A * | 11/1988 | Shihabi | 208/111.15 |
| 4,810,357 A | 3/1989 | Chester et al. | 208/78 |
| 4,900,707 A | 2/1990 | Cody et al. | 502/230 |
| 4,911,821 A | 3/1990 | Katzer et al. | 208/27 |
| 4,919,788 A | 4/1990 | Chen et al. | 208/59 |
| 4,975,177 A | 12/1990 | Garwood et al. | 208/27 |
| 5,017,535 A | 5/1991 | Schoonhoven et al. | 502/30 |
| 5,037,528 A | 8/1991 | Garwood et al. | 208/27 |
| 5,059,299 A | 10/1991 | Cody et al. | 208/27 |
| 5,075,269 A | 12/1991 | Degnan et al. | 502/77 |
| 5,098,684 A | 3/1992 | Kresge et al. | 423/277 |
| 5,146,022 A | 9/1992 | Buchanan et al. | 585/12 |
| 5,198,203 A | 3/1993 | Kresge et al. | 423/718 |
| 5,208,403 A | 5/1993 | Buchanan et al. | 585/7 |
| 5,227,353 A | 7/1993 | Apelian et al. | 502/74 |
| 5,232,579 A | 8/1993 | Absil et al. | 208/113 |
| 5,246,566 A | 9/1993 | Miller | 208/27 |
| 5,264,641 A | 11/1993 | Borghard et al. | 585/269 |
| 5,275,719 A | 1/1994 | Baker, Jr. et al. | 208/58 |
| 5,276,229 A | 1/1994 | Buchanan et al. | 585/255 |
| 5,282,958 A | 2/1994 | Santilli et al. | 208/111 |
| 5,288,395 A | 2/1994 | Marler et al. | 208/58 |
| 5,358,628 A | 10/1994 | Apelian et al. | 208/60 |
| 5,447,623 A * | 9/1995 | Ward | 208/111.15 |

(Continued)

FOREIGN PATENT DOCUMENTS

EP    0140468    5/1985

(Continued)

OTHER PUBLICATIONS

J.S. Beck, et al.: "A New Family of Mesoporous Molecular Sieves Prepared With Liquid Crystal Templates", J. Amer. Chem. Soc., 1992, vol. 114, p. 10834-843.

(Continued)

Primary Examiner—Tam M. Nguyen
(74) Attorney, Agent, or Firm—Jeremy J. Kliebert; James H. Takemoto; Gerard J. Hughes

(57) ABSTRACT

A waxy hydrocarbon feed is catalytically dewaxed with a catalyst that has been selectively activated. The selective activation of the catalyst involves contacting the dewaxing catalyst with a feed mixture containing waxy hydrocarbon and at least one oxygenate. The process results in improved catalyst performance resulting in improved yield of isomerate at equivalent pour.

68 Claims, 1 Drawing Sheet

U.S. PATENT DOCUMENTS

| | | | |
|---|---|---|---|
| 5,498,821 A | 3/1996 | Ryan et al. | 585/750 |
| 5,516,736 A | 5/1996 | Chang et al. | 502/64 |
| 5,573,657 A | 11/1996 | Degnan et al. | 208/144 |
| 5,643,440 A | 7/1997 | Borghard et al. | 208/58 |
| 5,689,031 A | 11/1997 | Berlowitz et al. | 585/734 |
| 5,730,858 A | 3/1998 | Olivier et al. | 208/28 |
| 5,837,639 A | 11/1998 | Kresge et al. | 502/64 |
| 5,911,874 A | 6/1999 | Cody et al. | 208/87 |
| 5,935,417 A | 8/1999 | Cody et al. | 208/87 |
| 5,951,848 A | 9/1999 | Baker, Jr. et al. | 208/28 |
| 5,993,644 A | 11/1999 | Xiao et al. | 208/89 |
| 6,013,171 A | 1/2000 | Cook et al. | 208/27 |
| 6,051,129 A | 4/2000 | Harris et al. | 208/138 |
| 6,068,757 A * | 5/2000 | Walker, III | 208/58 |
| 6,080,301 A | 6/2000 | Berlowitz et al. | 208/18 |
| 6,090,989 A | 7/2000 | Trewella et al. | 585/13 |
| 6,096,189 A | 8/2000 | Cody et al. | 208/87 |
| 6,099,719 A | 8/2000 | Cody et al. | 208/87 |
| 6,103,101 A | 8/2000 | Fragelli et al. | 208/89 |
| 6,136,181 A | 10/2000 | Ziemer | 208/144 |
| 6,179,994 B1 | 1/2001 | Clark et al. | 208/27 |
| 6,190,532 B1 | 2/2001 | Degnan et al. | 208/27 |
| 6,231,749 B1 | 5/2001 | Degnan et al. | 208/27 |
| 6,264,826 B1 | 7/2001 | Xiao et al. | 208/18 |
| 6,294,077 B1 | 9/2001 | Dougherty et al. | 208/27 |
| 6,303,534 B1 | 10/2001 | Strohmaier et al. | 502/214 |
| 6,310,265 B1 | 10/2001 | Chester et al. | 585/739 |
| 6,322,692 B1 | 11/2001 | Cody et al. | 208/18 |
| 6,337,010 B1 | 1/2002 | Hofer | 208/58 |
| 6,383,366 B1 | 5/2002 | Riley et al. | 208/137 |
| 6,399,845 B1 | 6/2002 | Raulo et al. | 585/739 |
| 6,420,618 B1 | 7/2002 | Berlowitz et al. | 585/310 |
| 6,663,768 B1 | 12/2003 | Miller | 208/27 |
| 2001/0004972 A1 | 6/2001 | Miller et al. | 208/18 |
| 2001/0006154 A1 | 7/2001 | Krug et al. | 208/18 |
| 2002/0003102 A1 | 1/2002 | O'Rear et al. | 208/18 |
| 2003/0168379 A1 | 9/2003 | Degnan et al. | 208/27 |

FOREIGN PATENT DOCUMENTS

| | | |
|---|---|---|
| EP | 0147873 | 9/1988 |
| EP | 0635557 | 1/1995 |
| EP | 0707057 | 4/1996 |
| EP | 0776959 | 6/1997 |
| EP | WO 99/41336 | 8/1999 |
| EP | 0909304 | 9/2001 |
| EP | WO 02/48283 | 6/2002 |
| FR | 2805543 | 2/2000 |
| FR | 2805542 | 8/2001 |
| FR | WO 01/64339 | 9/2001 |
| GB | 772478 | 4/1957 |
| GB | 1582789 | 1/1981 |
| GB | 2109402 | 6/1983 |
| GB | 2311789 | 10/1997 |
| SU | 1696391 | 12/1991 |
| WO | WO 96/03359 | 2/1996 |
| WO | WO 97/18278 | 5/1997 |
| WO | WO 99/20720 | 4/1999 |
| WO | WO 00/78677 | 12/2000 |
| WO | WO 01/07538 | 2/2001 |
| WO | WO 01/18156 | 3/2001 |
| WO | WO 01/64339 | 9/2001 |
| WO | WO 02/42207 | 5/2002 |
| WO | WO 02/48291 | 6/2002 |
| WO | WO 02/88279 | 11/2002 |
| WO | WO 02/99014 | 12/2002 |

OTHER PUBLICATIONS

N.Y. Chen, et al.: "TMA-Offretite. Relationship Between Structural and Catalytic Properties", J. Catalysis, 1984, vol. 86, p. 24-31.

* cited by examiner

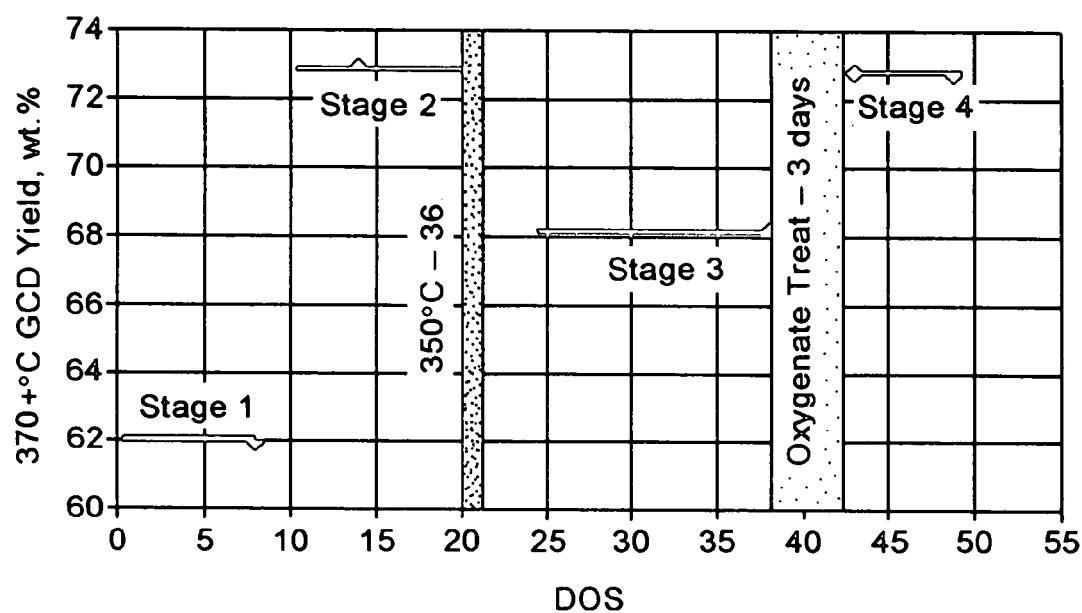

WAX ISOMERATE YIELD ENHANCEMENT BY OXYGENATE PRETREATMENT OF FEED

CROSS-REFERENCE TO RELATED APPLICATION

This patent application claims benefit of U.S. Provisional Patent Application Ser. No. 60/416,869 filed Oct. 8, 2002.

FIELD OF THE INVENTION

This invention relates to a dewaxing process. More particularly, waxy hydrocarbon feed is catalytically dewaxed by contacting the feed containing at least one oxygenate and dewaxing the oxygenate containing feed with dewaxing catalyst. The catalyst is selectively activated by the oxygenate.

BACKGROUND OF THE INVENTION

Historically, lubricant oil basestocks were prepared by a solvent extraction process in which a cut from a vacuum distillation unit is solvent extracted to produce a raffinate rich in paraffins and an extract rich in aromatics. The raffinate was then solvent dewaxed to address basestock quality issues such as pour point. The ability of the solvent dewaxing process to meet increased demands placed on basestock quality is limited since improvements in properties such as pour point came at the expense of basestock yield. The solvent dewaxing process is designed to separate wax from base oil thereby eliminating the highest VI components of the waxy feed. Thus in order to achieve the target pour point, high VI components are removed thereby lowering the yield.

An alternative method for preparing lubricant oil basestocks is catalytic dewaxing. Catalytic dewaxing may be accomplished by two dewaxing mechanisms: hydrocracking or hydroisomerization. The dewaxing catalysts which function by hydrocracking generally result in basestock yields which are comparable to or lower than solvent dewaxing. Dewaxing catalysts with an isomerization function can convert wax in feed to isomerate boosting yield and VI over solvent dewaxing to the same target pour point. Dewaxing catalysts which function by hydroisomerization take long chain waxy paraffins and isomerize them to branched chain species having desirable low temperature and volatility properties. Under actual operating conditions, it is not expected that a dewaxing catalyst will function exclusively by either mode of dewaxing.

Dewaxing catalysts with a hydroisomerization function are generally intolerant of heteroatom contaminants, and typically employ a hydrotreating step before dewaxing in order to remove heteroatom contaminants from the feed as such contaminants result in accelerated catalyst deactivation.

Although dewaxing catalysts with an isomerization function are well known in the art, there is still a need for catalysts which result in better yields and product qualities by minimizing hydrocracking.

SUMMARY OF THE INVENTION

It has been discovered that the performance of dewaxing catalysts can be improved by the addition of oxygenates. Accordingly, the present invention relates to a process for catalytically dewaxing a waxy mineral hydrocarbon feed which comprises:

(a) forming a mixture containing the waxy hydrocarbon feed and at least one oxygenate; and
(b) contacting the mixture from step (a) with a dewaxing catalyst under conditions effective to catalytically dewax the feed.

Another embodiment relates to a process for catalytically dewaxing a mineral hydrocarbon feed containing at least 15 wt. % wax, based on hydrocarbon feed which comprises:

(a) forming a mixture containing the hydrocarbon feed and at least one oxygenate wherein the amount of oxygenate in the mixture is at least about 100 wppm, measured as oxygen, and
(b) contacting the mixture from step (a) with a dewaxing catalyst which contains at least one molecular sieve containing at least one 10 or 12 ring under conditions effective to catalytically dewax the feed.

A further embodiment relates to a process for catalytically dewaxing a mineral hydrocarbon feed containing at least 15 wt. % wax, based on hydrocarbon feed which comprises:

(a) forming a mixture containing the hydrocarbon feed and at least one alcohol, carboxylic acid, ester, aldehyde, ketone or ether wherein the amount of oxygen in the mixture is at least about 100 wppm, measured as oxygen, and
(b) contacting the mixture from step (a) with a dewaxing catalyst which contains at least one molecular sieve containing at least one 10 or 12 ring channel under conditions effective to catalytically dewax the feed.

Yet another embodiment relates to a process for catalytically dewaxing a mineral hydrocarbon feed containing at least 15 wt. % wax, based on hydrocarbon feed which comprises:

(a) hydrotreating the hydrocarbon feed in the presence of a hydrotreating catalyst under hydrotreating conditions to produce a hydrotreated feed and sulfur- and nitrogen-containing contaminants;
(b) separating the hydrotreated feed from the sulfur- and nitrogen-containing contaminants;
(c) forming a mixture containing the separated hydrotreated feed and at least one alcohol, carboxylic acid, ester, aldehyde, ketone or ether wherein the amount of oxygen in the separated hydrotreated feed is at least about 100 wppm, measured as oxygen; and
(d) contacting the mixture from step (c) with a dewaxing catalyst which contains a molecular sieve containing at least one 10 or 12 ring channel under conditions effective to catalytically dewax the feed.

A further embodiment relates to a process for catalytically dewaxing a mineral hydrocarbon feed containing at least 15 wt. % wax, based on hydrocarbon feed which comprises:

(a) forming a mixture containing the hydrocarbon feed and at least one alcohol, carboxylic acid, ester, aldehyde, ketone or ether wherein the amount of oxygen in the mixture is at least about 100 wppm, measured as oxygen, and
(b) contacting the mixture from step (a) with a dewaxing catalyst which is ZSM-48 under conditions effective to catalytically dewax the feed.

A further embodiment relates to a process for catalytically dewaxing a mineral hydrocarbon feed containing at least about 15 wt. % wax, based on hydrocarbon feed, which comprises:

(a) forming a mixture containing the hydrocarbon feed and water wherein the amount of oxygen in the mixture is at least about 100 wppm, measured as oxygen, and
(b) contacting the mixture from step (a) with a dewaxing catalyst which contains at least one molecular sieve containing at least one 10 or 12 ring channel under conditions effective to catalytically dewax the feed.

A still further embodiment relates to a process for catalytically dewaxing a Fischer-Tropsch wax containing greater than 0.5 wppm sulfur, based on Fischer-Tropsch wax, which comprises:
(a) forming a mixture containing the hydrocarbon feed and at least one oxygenate wherein the amount of oxygenate in the mixture is at least about 100 wppm, measured as oxygen, and
(b) contacting the mixture from step (a) with a dewaxing catalyst which contains at least one molecular sieve containing at least one 10 or 12 ring under conditions effective to catalytically dewax the feed.

The catalytic dewaxing of wax-containing feeds using the selectively activated dewaxing catalyst according to the invention results in a product with at least one of improved isomerate yield, viscosity, low temperature properties and VI compared to a non-activated catalyst.

BRIEF DESCRIPTION OF THE DRAWING

The FIGURE is a graph showing a comparison of the effect of oxygenate treatment versus no oxygenate on a hydrotreated slack wax.

DETAILED DESCRIPTION OF THE INVENTION

Feedstocks

The feedstock used in the process of the invention are wax-containing feeds that boil in the lubricating oil range, typically having a 10% distillation point greater than 650° F. (343° C.), measured by ASTM D 86 or ASTM 2887, and are derived from mineral or synthetic sources. The wax content of the feedstock is at least about 15 wt. %, based on feedstock and can range up to 100 wt. % wax. The wax content of a feed may be determined by nuclear magnetic resonance spectroscopy (ASTM D5292), by correlative ndM methods (ASTM D3238) or by solvent means (ASTM D3235). The waxy feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process such as that based on iron containing catalysts as well as other Groups 8, 9 or 10 metal sulfide catalysts for use in carbon monoxide hydrogenation.

Feedstocks may have high contents of nitrogen- and sulfur-containing contaminants. Mineral based feedstocks may contain from 0 up to 0.2 wt. % of nitrogen, based on feed and from 0 up to 3.0 wt. % of sulfur, based on feed can be processed in the present process. The minimum sulfur content of synthetic feedstocks based on Fischer-Tropsch waxes prepared using iron or other Groups 8, 9 or 10 metal sulfide based catalysts is about 0.5 ppmw, based on feed. Feeds having a high wax content typically have high viscosity indexes of up to 200 or more. Sulfur and nitrogen contents may be measured by standard ASTM methods D5453 and D4629, respectively.

Feedstock Hydroprocessing

Feedstocks having high contents of nitrogen- and sulfur-containing contaminants are preferably hydroprocessed prior to dewaxing. Hydroprocessing may be by hydrotreating or hydrocracking.

For hydrotreating, the catalysts are those effective for hydrotreating such as catalysts containing Group 6 metals (based on the IUPAC Periodic Table format having Groups from 1 to 18), Groups 8–10 metals, and mixtures thereof. Preferred metals include nickel, tungsten, molybdenum, cobalt and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst. Suitable metal oxide supports include oxides such as silica, alumina, silica-aluminas or titania, preferably alumina. Preferred aluminas are porous aluminas such as gamma or eta. The amount of metals, either individually or in mixtures, ranges from about 0.5 to 35 wt. %, based on the catalyst. In the case of preferred mixtures of groups 9–10 metals with group 6 metals, the groups 9–10 metals are present in amounts of from 0.5 to 5 wt. %, based on catalyst and the group 6 metals are present in amounts of from 5 to 30 wt. %. The amounts of metals may be measured by atomic absorption spectroscopy, inductively coupled plasma-atomic emission spectrometry or other methods specified by ASTM for individual metals.

For hydrocracking, the catalyst may be any catalyst used for hydrocracking. Such catalysts typically employ an acidic, large pore size zeolite within the porous support material with an added metal hydrogenation/dehydrogenation function. The acidic functionality in the hydrocracking catalyst is provided either by a large pore, amorphous material such as alumina, silica-alumina or silica or by a large pore size crystalline material, preferably a large pore size aluminosilicate zeolite such as zeolite X, Y, ZSM-3, ZSM-18, ZSM-20 or zeolite beta. The zeolites may be used in various cationic and other forms, preferably forms of higher stability so as to resist degradation and consequent loss of acidic functionality under the influence of the hydrothermal conditions encountered during the hydrocracking. Thus, forms of enhanced stability such as the rare earth exchanged large pore zeolites, e.g., REX and REY are preferred, as well as the so-called ultra stable zeolite Y (USY) and high silica zeolites such as dealuminized Y or dealuminized mordenite. Hydrotreating and hydrocracking catalysts are commercially available from catalyst manufacturers.

The hydroprocessing catalysts may include a binder such as silica, silica/alumina or alumina or other metal oxides e.g., magnesia, titania, and the ratio of binder to zeolite will typically vary from 10:90 to 90:10, more commonly from about 30:70 to about 70:30 (by weight).

Hydrotreating conditions include temperatures of from 150 to 400° C., preferably 200 to 350° C., a hydrogen partial pressure of from 1480 to 29786 kPa (200 to 3000 psig), preferably 2859 to 13891 kPa (400 to 2000 psig), a space velocity of from 0.1 to 10 LHSV, preferably 0.1 to 5 LHSV, and a hydrogen to feed ratio of from 89 to 1780 $m^3/m^3$ (500 to 10000 scf/B), preferably 178 to 890 $m^3/m^3$.

Hydrocracking conditions include temperatures of from 300 to 480° C., preferably 315 to 425° C., a hydrogen partial pressure of from 6996 to 20786 kPa (1000 to 3000 psig), preferably 10443 to 17338 kPa (1500 to 2500 psig), a space velocity of from 0.1 to 10 LHSV, preferably 0.5 to 5 LHSV, and a hydrogen to feed ratio of from 178 to 1780 m³/m³ (1000 to 10000 Scf/B), preferably 356 to 1780 m³/m³ (2000 to 10000 Scf/B).

Hydrotreating or hydrocracking converts sulfur- and nitrogen-containing contaminants to gaseous species such as hydrogen sulfide and ammonia. Since nitrogen-containing contaminants are typically the most undesirable from the standpoint of maintaining dewaxing catalyst activity, conditions are such as to reduce nitrogen-containing species to acceptable levels with regard to maintaining catalyst activity. Hydroprocessing conditions which are sufficient to reduce the concentration of nitrogen-containing contaminants to acceptable levels will reduce oxygen-containing species to essentially zero.

Gaseous sulfur- and nitrogen-containing contaminants such as hydrogen sulfide and ammonia are preferably separated from the hydroprocessed feed prior to dewaxing by stripping or other separation techniques well known in the art for separating gases from liquids.

Dewaxing Selectivity

The present process for the catalytic dewaxing of waxy feeds utilizes a catalyst that has been activated by contacting the catalyst with an oxygenate. A preferred dewaxing catalyst is one whose mode of dewaxing is by isomerizing wax molecules to isomerates with boiling points in the lube range.

The dewaxing catalyst may be either crystalline or amorphous. Crystalline materials are molecular sieves that contain at least one 10 or 12 ring channel and may be based on aluminosilicates (zeolites), or may be based on aluminophosphates. Zeolites used for oxygenate treatment may contain at least one 10 or 12 channel. Examples of such zeolites include ZSM-5, ZSM-11, ZSM-22, ZSM-23, ZSM-35, ZSM-48, ZSM-57, ferrierite, EU-1, NU-87, ITQ-13 and MCM-71. Examples aluminophosphates containing at least one 10 ring channel include SAPO-11 and SAPO-41. Examples of molecular sieves containing 12 ring channels include zeolite beta, ZSM-12, MCM-68 SAPO-5, SAPO-31, MAPO-36, ZSM-18, mordenite, faujasite and offretite. It should be noted that a dewaxing catalyst such as ZSM-5 can have altered dewaxing properties by adjusting catalyst properties, such as acidity, metal dispersion and catalyst particle size as noted in U.S. Pat. No. 6,294,077. The molecular sieves are described in U.S. Pat. Nos. 5,246,566, 5,282,958, 4,975,177, 4,397,827, 4,585,747, 5,075,269 and 4,440,871. MCM-68 is described in U.S. Pat. No. 6,310,265. MCM-71 and ITQ-13 are described in PCT published applications WO 0242207 and WO 0078677. Preferred catalysts include ZSM-48, ZSM-22 and ZSM-23. Especially preferred is ZSM-48. As used herein, ZSM-48 includes EU-2, EU-11 and ZBM-30 which are structurally equivalent to ZSM-48. The molecular sieves are preferably in the hydrogen form. Reduction can occur in situ during the dewaxing step itself or can occur ex situ in another vessel. Amorphous dewaxing catalysts include alumina, fluorided alumina, silica-alumina, fluorided silica-alumina and silica-alumina doped with Group 3 metals. Such catalysts are described for example in U.S. Pat. Nos. 4,900,707 and 6,383,366.

The dewaxing catalysts are bifunctional, i.e., they are loaded with a metal hydrogenation component, which is at least one Group 6 metal, at least one Group 8–10 metal, or mixtures thereof. Preferred metals are Groups 9–10 metals. Especially preferred are Groups 9–10 noble metals such as Pt, Pd or mixtures thereof (based on the IUPAC Periodic Table format having Groups from 1 to 18). These metals are loaded at the rate of 0.1 to 30 wt. %, based on catalyst.

Catalyst preparation and metal loading methods are described for example in U.S. Pat. No. 6,294,077, and include for example ion exchange and impregnation using decomposable metal salts. Metal dispersion techniques and catalyst particle size control is described in U.S. Pat. No. 5,282,958. Catalysts with small particle size and well dispersed metal are preferred.

The molecular sieves are typically composited with binder materials that are resistant to high and may be employed under dewaxing conditions to form a finished dewaxing catalyst or may be binderless (self-bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina -thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst may be used in the sulfided or unsulfided form, and is preferably in the sulfided form.

Dewaxing conditions include temperatures of from 250–400° C., preferably 275 to 350° C., pressures of from 791 to 20786 kPa (100 to 3000 psig), preferably 1480 to 17339 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m³/m³ (250 to 10000 scf/B), preferably 89 to 890 m³/m³ (500 to 5000 scf/B).

Oxygenates used to selectively activate the dewaxing catalyst are organic, oxygen-containing compounds (organo-oxygenates) which form water under hydrodewaxing conditions. Oxygenates include carboxylic acids, alcohols including polyols, esters, aldehydes, ethers, ketones and mixtures thereof, or an inorganic oxygenate which is water. Preferred oxygenates are alcohols, ester, ethers and carboxylic acids, especially alcohols. The organo moieties contain at least 1 carbon atom and may range up to oxygen contained in oxidized hydrocarbon feeds in the lube boiling range (343° C.+as measured by ASTM D 86 or ASTM 2887).

The feed used to selectively activate (selectivate) the catalyst contains at least about 100 wppm, measured as oxygen, of at least one oxygenate, preferably at least about 400 wppm, measured as oxygen, of at least one oxygenate. Amounts of oxygenates greater than 10,000 wppm will not adversely affect the dewaxing process or products. The total oxygen content of an oxygenate can be measured by instrumental methods such as neutron activation analysis which may be combined with high resolution proton nuclear magnetic resonance, gas chromatography with oxygen flame ionization detector, gas chromatography-mass spectrometry (GC-MS) or fourier transform infrared spectroscopy. Neutron activation analysis is preferred for low concentrations of oxygenates. Oxygenate contents of feeds (as oxygenate) may be determined by proton nuclear magnetic resonance or by GC-MS.

Various methods have been proposed for measuring the selectivity of dewaxing catalysts. In one method described in J. Catalysis, 1984, 86, 24–31, a feedstock is catalytically dewaxed over the zeolite whose selectivity is determined at various reaction severities to achieve different product pour points. The conversion required to achieve a given degree of dewaxing may then be compared with a reference catalyst such as ZSM-5 to determine relative selectivity. In U.S. Pat. No. 5,282,958, selectivity is measured for a given molecular sieve having a defined crystallite size and pore diameter by measuring the isomerization of n-hexadecane under a given set of test conditions.

In the present invention, selectivity for a given catalyst is defined as the fractional amount of lube boiling range isomerate formed at the target pour point from the wax component of the feed. The improvement in selectivity as a result of oxygenate treatment for a given dewaxing catalyst is to isomerize at least 4 relative % more of the wax component into lube boiling range isomerate at the pour point target, preferably more than 6 relative %, most preferably more than 10 relative %.

The selectivity improvement for any give dewaxing catalyst may be calculated as illustrated in the hypothetical example given in the following chart showing isomerate yield improvement at equivalent pour point for dewaxing a waxy feed. Catalyst A and Catalyst B (which is Catalyst A treated with oxygenate). The yield for the example is obtained by adjusting if necessary dewaxing conditions of temperature and space velocity to achieve equivalent pour point.

|  | Catalyst A (untreated) | Catalyst B (oxygenate treated) |
|---|---|---|
| Wax content of feed | 90.0% | 90.0% |
| Yield of isomerate at target pour | 61.0 wt. % | 72.0 wt. % |
| Isomerate selectivity | 56.7 * | 68.9 * |
| Selectivity improvement |  | 1.215 ** |
| Relative selectivity improvement % |  | 21.5% *** |

* Calculation: [61.0 − (100 − 90)]/90 = 56.7 [72.0 − (100 − 90)]/90 = 68.9
** 68.9/56.7 = 1.215; no improvement is 56.7/56.7 = 1.0
*** (1.215 − 1.000) × 100 = 21.5%

For any given catalyst, isomerate yield should improve with increasing wax content of the feed. Thus feeds with higher wax contents, e.g., greater than 40 wt. %, based on feed, are preferred.

Hydrofinishing

Following the dewaxing step, it is preferred to hydrofinish the product resulting from dewaxing in order to adjust product qualities to desired specifications. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV (hr$^{-1}$), preferably 0.5 to 3 hr$^{-1}$ and hydrogen treat gas rates of from 44.5 to 1780 m$^3$/m$^3$ (250 to 10,000 scf/B).

Hydrofinishing catalysts are those containing Group 6 metals (based on the IUPAC Periodic Table format having Groups from 1 to 18), Groups 8–10 metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. Noble metals are usually present in amounts no greater than about 1 wt. %. A preferred hydrofinishing catalyst contains MCM-41 whose preparation and use for hydrogenation is described in U.S. Pat. Nos. 5,098,684, 5,227,353, 5,573,657 and 5,264,641.

Control of the reaction parameters of the hydrofinishing step offers a useful way of varying the stability of the products. The hydrofinishing catalyst together with temperatures of about 150–350° C. (446°–572° F.) will minimize aromatics. They will also provide products having good oxidative stability, UV light stability, and thermal stability. Space velocity in the hydrofinisher also offers a potential for aromatics saturation control with the lower space velocities effecting greater aromatics saturation.

Catalyst Preparation and Process Description

Since normal hydrocarbon feedstocks derived from petroleum contain amounts of sulfur and nitrogen that are detrimental to dewaxing catalysts, it is preferred that such feedstocks are hydrotreated and/or hydrocracked prior to dewaxing. Thus the feedstocks to the present catalytic dewaxing process that contain unacceptable levels of sulfur and nitrogen contaminants are preferably hydroprocessed and subsequently stripped to remove gaseous sulfur- and nitrogen-containing contaminants such as hydrogen sulfide and ammonia. If hydrocracking is the mode of hydroprocessing, the hydrocracked product may be both stripped and fractionated to isolate specific cuts for dewaxing. The hydroprocessed feedstocks are then sent to the dewaxing step.

The catalysts used in the catalytic dewaxing step are usually purchased from a catalyst manufacturer. The user has the option of metal-loading the catalyst or purchasing the catalyst in the metal-loaded form. As noted previously, metal loading can be accomplished by impregnating the dewaxing catalyst with a decomposable metal salt such as an amine salt, e.g., platinum tetramine complex followed by heating. Sulfiding can be accomplished by treating the metal loaded catalyst with a sulfiding mixture such as hydrogen/hydrogen sulfide or other sulfiding agent, or by contacting the catalyst with hydrogen and a feedstock spiked with a sulfiding agent or by using a feedstock containing organo sulfur compounds.

In order to selectively activate the dewaxing catalyst, the oxygenate or mixture of oxygenates may be added directly to the hydrocarbon feed to be dewaxed. Alternatively, the dewaxing catalyst can be selectively activated and the activated catalyst used in the dewaxing process. In the former process, a hydrocarbon feed containing at least about 100 wppm, measured as oxygen, of at least one oxygenate is contacted with the dewaxing catalyst under dewaxing conditions. Alternatively, the dewaxing catalyst can be selectively activated prior to use in the dewaxing process which activation may be separate from the dewaxing process itself. In this case, the dewaxing catalyst is heated at a temperature of from 120 to 400° C. and a hydrogen pressure of from 101 to 20786 kPa (0 to 3000 psig) in the presence of a feed containing at least about 100 wppm, measured as oxygen, of at least one oxygenate. The feed may be the same or different from the hydrocarbon feed to be dewaxed. Thus the feed may either be a carrier feed or the hydrocarbon feed to be dewaxed. If the feed is a carrier feed, it is preferred that the carrier be a hydrocarbon such as product resulting from the present catalytic dewaxing process. As noted previously, the dewaxing catalyst may be used in the sulfided or unsulfided form and may be reduced.

Catalyst preparation and subsequent dewaxing can be accomplished in a single reactor or in separate reactors. In a preferred embodiment, a noble metal loaded ZSM-48 dewaxing catalyst is placed in a reactor and hydrogen and a carrier feedstock containing sulfiding agent added to the reactor. It is preferred that the carrier feedstock be similar to a basestock cut expected as a final product, e.g., a 100N oil. The catalyst is reduced, sulfided or both reduced and sulfided. The reduced and/or sulfided catalyst can then be selectively activated by contacting with a carrier containing at least one oxygenate. The carrier can be either the feedstock to be dewaxed or some other hydrocarbon feedstock such as the carrier used to sulfide the catalyst.

Once the catalyst has been selectively activated with oxygenate(s), the feedstock to be dewaxed is added to the reactor and dewaxing takes place under conditions defined above. Further oxygenate treatment may be added as needed to maintain catalyst activity.

The product from catalytic dewaxing may be sent to hydrofinishing in a separate reactor without any intervening disengagement. Direct cascade from dewaxer to hydrofinisher is preferred thus avoiding the expense involved in an additional stripping step. Hydrofinishing is done in the presence of hydrogen and a hydrofinishing catalyst. The hydrofinishing reaction conditions are noted hereinbefore. Hydrofinishing is useful to remove color bodies, enhance stability and improve toxicological properties.

The hydrofinished product is then fractionated to isolate desired lubricant products. The individual cuts of lubricants products are attractive as basestocks for meeting Group II and Group III requirements. These Group classifications are those used by the American Petroleum Institute (API). API Group II basestocks have a saturates content of 90 wt. % or greater, a sulfur content of not more than 0.03 wt. % and a VI greater than 80 but less than 120. API Group III basestocks have the same requirements as Group II basestocks except that the VI is greater than 120.

The following non-limiting examples will serve to illustrate the subject invention.

EXAMPLES

Example 1

This example demonstrates slack wax isomerates yield credit sustained by ZSM-48 catalyst selectivation using an oxygenate contained feedstock. The selectivation was carried out on a dried and reduced 0.6 wt. % Pt/ZSM-48 containing 35 wt. % alumina. The reference commercial ZSM-48 catalyst, 0.6 wt. % Pt/ZSM-48/35 wt. % alumina in metal oxide form, was dried at 180° C. under 200 psig flowing nitrogen pressure for 3 hours. The catalyst was then reduced at 260° C. under 200 psig flowing hydrogen for 4 hours to produce the dried and reduced catalyst (Cat-A). Temperature was then reduced to 150° C. and hydrotreated 150N slack wax (table 1) was cut into the unit.

ZSM-48 selectivation (Cat-B) was performed on a reduced catalyst (Cat-A) by processing an oxidized hydrotreated 150N slack wax containing between 1000 and 3000 ppm O, as measured by Neutron Activation Analysis. The selectivation was carried out at 332° C. under 1000 psig hydrogen pressure to produce Cat-B.

Four 316 stainless steel, ⅜" diameter reactors with appropriate high pressure connectors were each charged with 8 cc of catalyst material to be evaluated and 2 cc inert. The catalyst loaded reactors are immersed in a fluid bed, constant temperature sand-bath equipped with electrical heaters for temperature control. Appropriate mechanical connections were installed to allow reactor operation at nominal pressure of 1000 psig (6.89 MPa) and nominal drying, reduction and test temperatures from 150° C. to 350° C.

Under steady state conditions liquid feed (hydrotreated 150 N slack wax) and gaseous high purity hydrogen (>99 vol. % $H_2$) are pumped over the fixed catalyst bed. Liquid and gaseous product are subsequently depressurized and sampled periodically. Aliquots of liquid product and liquid feed are analyzed for composition and quality.

Operating conditions were set to 332° C., 1.0 $h^{-1}$ Liquid Hourly Space Velocity (LHSV), and 1000 psig Hydrogen. The hydrotreated 150N slack wax liquid feed is described in Table 1.

Catalyst isomerate selectivity is assessed by calculating cracking. Cracking is calculated measuring gas and liquid effluents composition (370° C. minus) by GC and GCD (gas chromatographic distillation by ASTM 2887) respectively, compared to hydrotreated 150N slack wax composition. Catalyst selectivity is determined by comparing yield of isomerate (370° C. plus) at equivalent pour. Pour points are determined by standard ASTM test (D 97). The branched chain properties of isomerate was checked using NMR (nuclear magnetic resonance, particularly carbon 13 NMR). Isomerate quality such as viscosity and viscosity index was also measured or calculated using standard ASTM tests (D445-94 and D2270-91) using a Houillon Automated Viscometer with a repeatability of 0.5%.

TABLE 1

| Hydrotreated 150N Slack Wax Composition | |
| --- | --- |
| Grade | 150 N |
| Sulfur (wppm) | <2 |
| Viscosity @ 100° C. (cSt) | 3.601 |
| Wax content (Wt. %) | 95.6 |
| Oil in wax (Wt. %) | 4.6 |

TABLE 2

| Treatment | Cat-A Reduced | Cat-B Reduced + [O] treated |
| --- | --- | --- |
| Days on Oil | 58 | 29 |
| Temperature (° C.) | 332 | 332 |
| 370+° C. Yield (wt. %) | 61.9 | 73.9 |
| Selectivity Improvement (%) | Base | +21 |
| 370+° C. Isomerate K. Viscosity @40° C. (cSt) | 12.380 | 13.341 |
| 370+° C. Isomerate K. Viscosity @100° C. (cSt) | 3.262 | 3.501 |
| 370+° C. Isomerate Viscosity Index | 137 | 148 |
| 370+° C. Isomerate Pour Point (° C.) | −20 | −16 |

Data reported in table 2 show about a 10 wt. % yield credit (adjusted to the same pour point) for the oxygenate selectivated catalyst. The error limits for yield and pour points are ±1 and ±3, respectively. The correction for yield based on pour point is 0.55% for each degree change in pour point. Furthermore, product quality is also improved with about a 10 VI improvement. The enhanced product quality can also be seen in the VI properties (148) in comparison to viscosity at 100° C. (3.5 cSt). This feature of high VI at viscosity is indicative of the unusually high quality of the present products.

Wax isomerate selectivity is defined as $$\text{Selectivity} = \frac{370° \text{ C.+yield(\%)} - \text{Feed oil content (\%)}}{\text{Feed Wax content (\%)}}$$

Selectivity Improvement is defined as:

$$\text{Selectivity Improvement} = \frac{\text{Selectivated Catalyst Selectivity}}{\text{Base Catalyst Selectivity}}$$

Calculation example from ex. 1

Selectivity Improvement =

$$\frac{(73.9 - 4.6)/95.4}{(61.9 - 4.6)/95.4} = \frac{0.726}{0.600} = 1.21 \text{ or } 21\% \text{ over base case}$$

Example 2

This example compares isomerate selectivity of ex-situ sulfided (Cat-C) and in-situ sulfided (Cat-D) ZSM-48 to that of the reduced catalyst (Cat-A). This example also demonstrates yield advantage by oxygenate treat of the ex-situ sulfided catalyst (Cat-E).

All catalysts were dried following the same procedure described in example 1 prior to any treatment.

(a) Cat-C was pre-sulfided ex-situ by using a 400 ppm $H_2S$ containing hydrogen treat gas. Cat-C was loaded, dried and wetted with 150N isomerate prior to processing hydrotreated 150N slack wax.
(b) Cat-D was dried under nitrogen, then sulfided in-situ in the reactor unit at 100 psig pressure and 200° C. for 48 hours using a spiked isomerate containing 400 ppm sulfur as dimethyl-disulfide.
(c) Cat-E was prepared in-situ in the reactor by treating the pre-sulfided (Cat-C) with a spiked isomerate containing 1000 ppm oxygen as n-decanol. The selectivation was carried out at 100 psig pressure, 200° C. for 48 hours.

TABLE 3

| Treatment | Cat-A Reduced | Cat-C Ex-situ sulfided | Cat-D In-situ sulfided | Cat-E Cat-C with [O] treat |
|---|---|---|---|---|
| Days on Oil | 58 | 8 | 8 | 8 |
| Temperature (° C.) | 332 | 329 | 329 | 329 |
| 370+° C. Yield (wt. %) | 61.9 | 61.9 | 61.0 | 73.7 |
| Selectivity Improvement (%) | Base | 0 | −1.5 | +20.5 |
| 370+° C. Isomerate K. Viscosity @40° C. (cSt) | 13.28 | 12.785 | 12.859 | 12.858 |
| 370+° C. Isomerate K. Viscosity @100° C. (cSt) | 3.262 | 3.371 | 3.354 | 3.446 |
| 370+° C. Isomerate Viscosity Index | 137 | 143 | 138 | 153 |
| 370+° C. Isomerate Pour Point (° C.) | −20 | −19 | −20 | −17 |

Data reported in table 3 show activity and selectivity equivalency between ex-situ (Cat-C) and in-situ (Cat-D) sulfided catalysts. Furthermore, no yield advantage is observed over the lined-out reduced catalyst (Cat-A). This example also shows that oxygenate selectivation of the ex-situ sulfided catalyst (Cat-E) produces a more selective catalyst having a 10 wt. % yield credit over the untreated catalyst (Cat-C).

Example 3

This example shows the impact on selectivity by treatment with other polar compound such as nitrogen.

Cat-F was prepared in-situ by treating the pre-sulfided (Cat-C) with a spiked isomerate containing 20 ppm nitrogen as n-butylamine. The catalyst treatment with n-butylamine was carried out at 100 psig pressure, 200° C. for 48 hours.

TABLE 4

| Treatment | Cat-C Ex-situ sulfided | Cat-E Cat-C with [O] treat | Cat-F Cat-C with [N] treat |
|---|---|---|---|
| Days on Oil | 8 | 8 | 8 |
| Temperature (° C.) | 329 | 329 | 329 |
| 370+° C. Yield (wt. %) | 61.9 | 73.7 | 52.7 |
| Selectivity Improvement (%) | Base | +20.5 | −16 |
| 370+° C. Isomerate K. Viscosity @40° C. (cSt) | 12.785 | 12.858 | 12.948 |
| 370+° C. Isomerate K. Viscosity @100° C. (cSt) | 3.371 | 3.446 | 3.390 |
| 370+° C. Isomerate Viscosity Index | 143 | 153 | 141 |
| 370+° C. Isomerate Pour Point (° C.) | −19 | −17 | −17 |

Data reported in table 4 demonstrate that treating the ex-situ sulfided ZSM-48 catalyst with a nitrogen compound results in a selectivity debit. This demonstrates the uniqueness of oxygenate over other polar compounds such as nitrogen compounds.

Example 4

This example demonstrates the impact of higher temperature operation on selectivity on a selectivated catalyst. This example also demonstrates that selectivation is reversible after a higher temperature operation as well as the possibility to re-selectivate in-situ.

The ex-situ sulfided catalyst (Cat-C) was loaded and dried according to the procedure described in Example 1.

As shown in the FIGURE:

Stage 1, the catalyst was lined-out with an oxygenate free hydrotreated 150N slack wax.

Stage 2, the catalyst was then treated with the oxidized hydrotreated 150N slack wax feedstock described in example 1 containing between 1000 and 3000 ppm oxygen (as oxygenate).

After Stage 2, the unit was washed using a medicinal grade white oil to remove all traces of polars and aromatics. The catalyst temperature was then increased to 350° C. under white oil at 1000 psig pressure and maintained at 350° C. for 36 hours. After the 36 hours hold, the temperature was reduced to the operating temperature of 328° C., this operation was also conducted under white oil.

Stage 3, after the higher temperature treatment, was run for 10 days using the same oxygenate free hydrotreated 150N slack wax used in stage 1. At the end of stage 3, the catalyst was exposed to the oxidized hydrotreated 150N slack wax feedstock described in example 1 containing between 1000 and 3000 ppm oxygenate, at 328° C. for 3 days.

Stage 4, after the higher temperature treatment, was run for 10 days using the same oxygenate free hydrotreated 150N slack wax used in stage 1.

TABLE 5

| Treatment | Stage 1 Ex-situ sulfided | Stage 2 Stage 1 after [O] treat | Stage 3 Stage 2 after High Temp. | Stage 4 Stage 3 after [O] treat |
|---|---|---|---|---|
| Days on Oil | 8 | 14 | 38 | 49 |
| Temperature (° C.) | 329 | 325 | 328 | 328 |
| 370+° C. Yield (wt. %) | 61.9 | 73.0 | 67.7 | 72.7 |
| Selectivity Improvement (%) | Base | +19 | +10 | +19 |
| 370+° C. Isomerate K. Viscosity @40° C. (cSt) | 12.785 | 13.798 | 13.695 | 12.814 |
| 370+° C. Isomerate K. Viscosity @100° C. (cSt) | 3.371 | 3.571 | 3.515 | 3.393 |
| 370+° C. Isomerate Viscosity Index | 143 | 147 | 141 | 145 |
| 370+° C. Isomerate Pour Point (° C.) | −19 | −19 | −23 | −19 |

Data in table 5 and FIG. 1 demonstrate:
a partial loss of the yield credit after higher temperature treatment (Stage 3 versus Stage 2)
   that ZSM-48 can be "re-selectivated" in-situ after processing an oxygenated containing feedstock (Stage 4 versus Stage 3).

Example 5

This Example demonstrates that the yield benefit from an oxygenate treatment can also be achieved with an amorphous dewaxing catalyst.

A 600N slack wax was hydrotreated and then exposed to air while still hot, and therefore subject to oxidation. A clean feed was produced in an integrated unit where the hydrotreated slack wax was directly fed to the hydrodewaxing catalyst without being exposed to hot air or moisture. The hydrodewaxing catalyst was an amorphous catalyst, 0.9 wt. % Pt on a 1.1 wt. % fluorided alumina.

The results are shown in Table 6.

TABLE 6

| | Clean Feed | Oxidized Feed |
|---|---|---|
| 370° C. + yield (%) (GCD*) | 69 | 73.3 |
| KV@100° C. | 5.78 | 5.78 |
| VI | 135 | 137 |

*GCD = gas chromatographic distillation

The data in Table 6 show that an amorphous dewaxing catalyst has improved yield when dewaxing occurs in the presence of feed containing oxygenates.

The invention claimed is:

1. A process for catalytically dewaxing a waxy mineral hydrocarbon feed which comprises:
   (a) forming a mixture containing the waxy hydrocarbon feed and from 100 wppm to 10000 wppm of at least one oxygenate; and
   (b) contacting the mixture from step (a) with a dewaxing catalyst which functions by isomerizing waxy molecules under conditions effective to catalytically dewax the feed.

2. The process of claim 1 wherein the waxy hydrocarbon feed contains at least about 15 wt. % wax, based on feed.

3. The process of claim 1 wherein the oxygenate is at least one alcohol, carboxylic acid, ester, aldehyde, ketone or ether.

4. The process of claim 1 wherein the oxygenate is water.

5. The process of claim 1 wherein the amount of oxygenate in the mixture is at least about 100 wppm, measured as oxygen.

6. The process of claim 1 wherein the dewaxing catalyst contains at least one molecular sieve containing at least one 10 or 12 ring channel.

7. The process of claim 6 wherein the molecular sieve is at least one of ZSM-5, ZSM-11, ZSM-22, ZSM-23, ZSM-35, ZSM-48, ZSM-57, ferrierite, EU-1, NU-87, SAPO-11, SAPO-41, ITQ-13 or MCM-71.

8. The process of claim 6 wherein the molecular sieve is at least one of zeolite beta, ZSM-12, MCM-68, SAPO-5, SAPO-31, MAPO-36, ZSM-18, offretite, mordenite or faujasite.

9. The process of claim 6 wherein the molecular sieve is ZSM-48.

10. The process of claim 1 wherein the conditions effective to catalytically dewax the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

11. The process of claim 1 wherein catalytic dewaxing of feed results in improved yield of isomerate boiling in the lube oil range at equivalent pour over the dewaxing catalyst without oxygenate treatment.

12. The process of claim 11 wherein the improved yield is at least 4 relative percent.

13. The process of claim 1 wherein the dewaxing catalyst is sulfided, reduced, or sulfided and reduced.

14. The process of claim 1 wherein the dewaxing catalyst bears a metal hydrogenation component.

15. The process of claim 14 wherein the metal hydrogenation component is at least one Group 9 or 10 noble metal.

16. A process for catalytically dewaxing a mineral hydrocarbon feed containing at least 15 wt. % wax, based on hydrocarbon feed, which comprises:
   (a) forming a mixture containing the hydrocarbon feed and at least one oxygenate wherein the amount of oxygenate in the mixture is at least about 100 wppm to 10000 wppm measured as oxygen, and
   (b) contacting the mixture from step (a) with a dewaxing catalyst which functions by isomerizing waxy molecules and contains at least one molecular sieve containing at least one 10 or 12 ring channel under conditions effective to catalytically dewax the feed.

17. The process of claim 16 wherein the oxygenate is at least one alcohol, carboxylic acid, ester, aldehyde, ketone or ether.

18. The process of claim 16 wherein the oxygenate is water.

19. The process of claim 16 wherein the molecular sieve is at least one of ZSM-5, ZSM-11, ZSM-22, ZSM-23, ZSM-35, ZSM-48, ZSM-57, ferrierite, EU-1, NU-7, SAPO-11, SAPO-41, ITQ-13 or MCM-71.

20. The process of claim 16 wherein the molecular sieve is at least one of zeolite beta, ZSM-12, MCM-68, SAPO-5, SAPO-31, MAPO-36, ZSM-18, offretite, mordenite or faujasite.

21. The process of claim 19 wherein the molecular sieve is ZSM-48.

22. The process of claim 16 wherein the conditions effective to catalytically dewax the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

23. The process of claim 16 wherein catalytic dewaxing of feed results in improved yield of isomerate boiling in the lube oil range at equivalent pour over the dewaxing catalyst without oxygenate treatment.

24. The process of claim 23 wherein the improved yield is at least 4 relative percent.

25. The process of claim 16 wherein the dewaxing catalyst is sulfided, reduced, or sulfided and reduced.

26. The process of claim 16 wherein the dewaxing catalyst bears a metal hydrogenation component.

27. The process of claim 26 wherein the metal hydrogenation component is at least one Group 9 or 10 noble metal.

28. A process for catalytically dewaxing a mineral hydrocarbon feed containing at least about 15 wt. % wax, based on hydrocarbon feed, which comprises:
(a) forming a mixture containing the hydrocarbon feed and at least one alcohol, carboxylic acid, ester, aldehyde, ketone or ether wherein the amount of oxygen in the mixture is at least about 100 wppm to 10000 wppm, measured as oxygen, and
(b) contacting the mixture from step (a) with a dewaxing catalyst which functions by isomerizing waxy molecules and contains at least one molecular sieve containing at least one 10 or 12 ring channel under conditions effective to catalytically dewax the feed.

29. The process of claim 28 wherein the molecular sieve is at least one of ZSM-5, ZSM-11, ZSM-22, ZSM-23, ZSM-35, ZSM-48, ZSM-57, ferrierite, EU-1, NU-87, SAPO-11, SAPO-41, ITQ-13 or MCM-71.

30. The process of claim 28 wherein the molecular sieve is at least one of zeolite beta, ZSM-12, MCM-68 SAPO-5, SAPO-31, MAPO-36, ZSM-18, offretite, mordenite or faujasite.

31. The process of claim 29 wherein the molecular sieve is ZSM-48.

32. The process of claim 28 wherein the conditions effective to catalytically dewax the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

33. The process of claim 28 wherein catalytic dewaxing of feed results in improved yield of isomerate boiling in the lube oil range at equivalent pour over the dewaxing catalyst without oxygenate treatment.

34. The process of claim 33 wherein the improved yield is at least 4 relative percent.

35. The process of claim 28 wherein the dewaxing catalyst is sulfided, reduced, or sulfided and reduced.

36. The process of claim 28 wherein the dewaxing catalyst bears a metal hydrogenation component.

37. The process of claim 36 wherein the metal hydrogenation component is at least one Group 9 or 10 noble metal.

38. A process for catalytically dewaxing a mineral hydrocarbon feed containing at least 15 wt. % wax, based on hydrocarbon, feed which comprises:

(a) hydrotreating the hydrocarbon feed in the presence of a hydrotreating catalyst under hydrotreating conditions to produce a hydrotreated feed and sulfur- and nitrogen-containing contaminants;
(b) separating the hydrotreated feed from the sulfur- and nitrogen-containing contaminants;
(c) adding to the separated hydrotreated feed at least one alcohol, carboxylic acid, ester, aldehyde, ketone or ether wherein the amount of oxygen in the separated hydrotreated feed mixture is at least about 100 wppm to 10000 wppm measured as oxygen; and
(d) contacting the mixture from step (c) with a dewaxing catalyst which functions by isomerizing waxy molecules and contains a molecular sieve containing at least one 10 or 12 ring channel under conditions effective to catalytically dewax the feed.

39. The process of claim 38 wherein the molecular sieve is at least one of ZSM-5, ZSM-11, ZSM-22, ZSM-23, ZSM-35, ZSM-48, ZSM-57, ferrierite, EU-1, NU-87, SAPO-11, SAPO-41, ITQ-13 or MCM-71.

40. The process of claim 38 wherein the molecular sieve is at least one of zeolite bets, ZSM-12, MCM-68 SAPO-5, SAPO-31, MAPO-36, ZSM-18, offretite, mordenite or faujasite.

41. The process of claim 39 wherein the molecular sieve is ZSM-48.

42. The process of claim 38 wherein the conditions effective to catalytically isomerize the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

43. The process of claim 38 wherein catalytic dewaxing of feed results in improved yield of isomerate boiling in the lube oil range at equivalent pour over the dewaxing catalyst without oxygenate treatment.

44. The process of claim 43 wherein the improved yield is at least 4 relative percent.

45. The process of claim 38 wherein the dewaxing catalyst is sulfided, reduced, or sulfided and reduced.

46. The process of claim 38 wherein the dewaxing catalyst bears a metal hydrogenation component.

47. The process of claim 46 wherein the metal hydrogenation component is at least one Group 9 or 10 noble metal.

48. A process for catalytically dewaxing a mineral hydrocarbon feed containing at least about 15 wt % wax, based on hydrocarbon feed, which comprises:
(a) forming a mixture containing the hydrocarbon feed and water wherein the amount of oxygen in the mixture is at least about 100 wppm to 10000 wppm, measured as oxygen, and
(b) contacting the mixture from step (a) with a dewaxing catalyst which functions by isomerizing waxy molecules and contains at least one molecular sieve containing at least one 10 or 12 ring channel under conditions effective to catalytically dewax the feed.

49. A process for catalytically dewaxing a mineral hydrocarbon feed containing at least 15 wt. % wax, based on hydrocarbon feed which comprises:
(a) forming a mixture containing the hydrocarbon feed and at least one alcohol, carboxylic acid, ester, aldehyde, ketone or ether wherein the amount of oxygen in the mixture is at least about 100 wppm to 1000 wppm, measured as oxygen, and
(b) contacting the mixture from step (a) with a dewaxing catalyst which is ZSM-48 under conditions effective to catalytically dewax the feed.

50. The process of claim 49 wherein the conditions effective to catalytically dewax the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

51. The process of claim 49 wherein catalytic dewaxing of feed results in improved yield of isomerate boiling in the lube oil range at equivalent pour over the dewaxing catalyst without oxygenate treatment.

52. The process of claim 49 wherein the improved yield is at least 4 relative percent.

53. The process of claim 52 wherein the dewaxing catalyst is sulfided, reduced, or sulfided and reduced.

54. The process of claim 49 wherein the dewaxing catalyst bears a metal hydrogenation component.

55. The process of claim 54 wherein the metal hydrogenation component is at least one Group 9 or 10 noble metal.

56. A process for catalytically dewaxing a Fischer-Tropsch wax containing greater than 0.5 wppm sulfur, based on Fischer-Tropsch wax, which comprises:
(a) forming a mixture containing the hydrocarbon feed and at least one oxygenate wherein the amount of oxygenate in the mixture is at least about 100 wppm to 10000 wppm, measured as oxygen, and
(b) contacting the mixture from step (a) with a dewaxing catalyst which functions by isomerizing waxy molecules and contains at least one molecular sieve containing at least one 10 or 12 ring under conditions effective to catalytically dewax the feed.

57. The process of claim 56 wherein the oxygenate is at least one alcohol, carboxylic acid, ester, aldehyde, ketone or ether.

58. The process of claim 56 wherein the oxygenate is water.

59. The process of claim 56 wherein the molecular sieve is at least one of ZSM-5, ZSM-11, ZSM-22, ZSM-23, ZSM-35, ZSM-48, ZSM-57, ferrierite, EU-1, NU-87, SAPO-11, SAPO-41, ITQ-13 or MCM-71.

60. The process of claim 56 wherein the molecular sieve is at least one of zeolite beta, ZSM-12, MCM-68, SAPO-5, SAPO-31, MAPO-36, ZSM-18, offretite, mordenite or faujasite.

61. The process of claim 59 wherein the molecular sieve is ZSM-48.

62. The process of claim 56 wherein the conditions effective to catalytically dewax the feed include a temperature of from 250 to 400° C., a pressure of from 791 to 20786 kPa, a liquid hourly space velocity of from 0.1 to 10 hr$^{-1}$ and a treat gas rate of from 45 to 1780 m$^3$/m$^3$.

63. The process of claim 56 wherein catalytic dewaxing of feed results in improved yield of isomerate boiling in the lube oil range at equivalent pour over the dewaxing catalyst without oxygenate treatment.

64. The process of claim 63 wherein the improved yield is at least 4 relative percent.

65. The process of claim 56 wherein the dewaxing catalyst is sulfided, reduced, or sulfided and reduced.

66. The process of claim 56 wherein the dewaxing catalyst bears a metal hydrogenation component.

67. The process of claim 56 wherein the metal hydrogenation component is at least one Group 9 or 10 noble metal.

68. The process of claim 56 wherein the Fischer-Tropsch wax is hydrotreated prior to step (a).

* * * * *